US011986684B2

(12) United States Patent
Lin et al.

(10) Patent No.: US 11,986,684 B2
(45) Date of Patent: May 21, 2024

(54) HARNESS CONNECTOR

(71) Applicant: Honeywell International Inc., Charlotte, NC (US)

(72) Inventors: Ling Lin, Shanghai (CN); Lyndon Liu, Shanghai (CN); Peng Zhou, Shanghai (CN); Pinghua Jiang, Shanghai (CN); Wenbo Wang, Shanghai (CN); Zheng Gu, Shanghai (CN); Xiaojuan Zhu, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 294 days.

(21) Appl. No.: 17/302,878

(22) Filed: May 14, 2021

(65) Prior Publication Data

US 2022/0314043 A1 Oct. 6, 2022

(30) Foreign Application Priority Data

Apr. 2, 2021 (CN) ......................... 202110360878.6

(51) Int. Cl.
*A62B 35/00* (2006.01)

(52) U.S. Cl.
CPC ...... *A62B 35/0037* (2013.01); *A62B 35/0018* (2013.01); *A62B 35/0031* (2013.01)

(58) Field of Classification Search
CPC ............ A62B 35/0037; A62B 35/0018; A62B 35/0031; A62B 35/0025; A44B 11/02
See application file for complete search history.

(56) References Cited

U.S. PATENT DOCUMENTS

| | | | | |
|---|---|---|---|---|
| 1,437,250 A | | 11/1922 | Kerngood | |
| D399,172 S | * | 10/1998 | Anscher | D11/218 |
| D507,990 S | * | 8/2005 | Yoshiguchi | D11/218 |
| 9,808,659 B2 | | 11/2017 | Chevalier | |
| 10,821,310 B2 | | 11/2020 | Jacob | |
| 2006/0005293 A1 | | 1/2006 | Frey et al. | |

(Continued)

FOREIGN PATENT DOCUMENTS

| | | | | |
|---|---|---|---|---|
| JP | 2003-245106 A | | 9/2003 | |
| JP | 2003245106 A | * | 9/2003 | A44B 11/02 |
| JP | 4980871 B2 | * | 7/2012 | A62B 35/00 |

(Continued)

OTHER PUBLICATIONS

Notification to Grant Patent Right issued in Chinese Application No. 202110360878.6 dated Aug. 31, 2021, 5 pages.

(Continued)

*Primary Examiner* — Brian D Mattei
*Assistant Examiner* — Jacob G Sweeney
(74) *Attorney, Agent, or Firm* — ALSTON & BIRD LLP

(57) ABSTRACT

Various embodiments illustrated herein disclose a full body harness that includes a connector. The connector includes a first plate and a second plate, where the first plate is identical to the second plate. The first plate and the second plate includes a plurality of slits to facilitate passage of a first harness and a second harness there through. The first plate is rotatably coupled to the second plate such that they are rotatable with respect to each other. Such a connector automatically enables easy adjustment of the harness based on an activity of a user who is wearing the harness.

12 Claims, 10 Drawing Sheets

(56) References Cited

U.S. PATENT DOCUMENTS

| | | | |
|---|---|---|---|
| 2008/0060873 | A1 | 3/2008 | Lang et al. |
| 2019/0313746 | A1 | 10/2019 | Hetrich |

FOREIGN PATENT DOCUMENTS

| | | | |
|---|---|---|---|
| JP | 4980871 | B2 | 7/2012 |
| WO | 2007/045823 | A1 | 4/2007 |
| WO | 2016/175663 | A1 | 11/2016 |

OTHER PUBLICATIONS

Extended European Search Report issued in European Application No. 21173518.8 dated Oct. 29, 2021, 8 pages.

Communication about intention to grant a European patent dated Jan. 8, 2024 for EP Application No. 21173518, 9 page(s).

* cited by examiner

HARNESS CONNECTOR

CROSS-REFERENCE TO RELATED APPLICATIONS

This application claims priority to and the benefit of Chinese Patent Application No. 202110360878.6, filed on Apr. 2, 2021, the contents of which is hereby incorporated by reference in its entirety.

TECHNOLOGICAL FIELD

An example embodiment relates generally to safety harness, and particularly full body harness, worn by first responders and other users who work on platforms situated at a height and or like.

BACKGROUND

Safety harness are commonly used as part of a fall protection system for persons subjected to the potential of a fall from a height. At a workplace, full-body safety harnesses are required when working on platforms that are at a height of six feet or greater. Such harnesses, which typically include both an upper torso portion (having, for example, shoulder straps) and a lower torso or seat portion (having, for example one or more leg straps and sometimes a seat strap), can be designed in many alternative manners. While working on such platforms or in such an environment, the workers may be required to move around, stand, squat or lean and with such actions the harness can become stiff and/or offer resistance to the movement. At times, the workers may feel uncomfortable while performing their daily activities in such a safety harness.

SUMMARY

In accordance with various illustrated embodiments, a safety apparatus includes a full body harness and a connector attached to the full body harness to enable a mobility of a user wearing the full body harness. The connector includes a first plate defining a first plurality of slits, a second plate defining a second plurality of slits, and a fastener. The fastener facilitates a coupling of the first plate with the second plate, such that the first plate and the second plate are rotatable with respect to each other. The first plate includes a first plurality of slits to receive a first harness, and a second plurality of slits in the second plate is configured to receive a second harness that is separate from the first harness. Further, the first plate is identical to the second plate.

Implementations may include one or more of the following features. The connector where each of the first plate and the second plate may include a plurality of arcuate portions at a peripheral region of the first plate and the second plate. The first plate may include a first rib, such that the first rib extends diametrically between the plurality of arcuate portions of the first plate, and where the second plate may include a second rib, such that the second rib extends between the plurality of arcuate portions of the second plate. The first rib and the second rib define a first cavity and a second cavity respectively, where the first cavity and the second cavity are configured to receive the fastener. A first surface of both, the first rib and the second rib define a downward slope towards distal ends of the first rib and the second rib from the first cavity and second cavity respectively. The plurality of arcuate portions on the first plate define a first channel and a second channel, such that the first channel and the second channel are configured to facilitate receiving of the first harness. The plurality of arcuate portions on the second plate define a third channel and a fourth channel, such that the third channel and the fourth channel are configured to facilitate receiving of the second harness.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Figure 1:
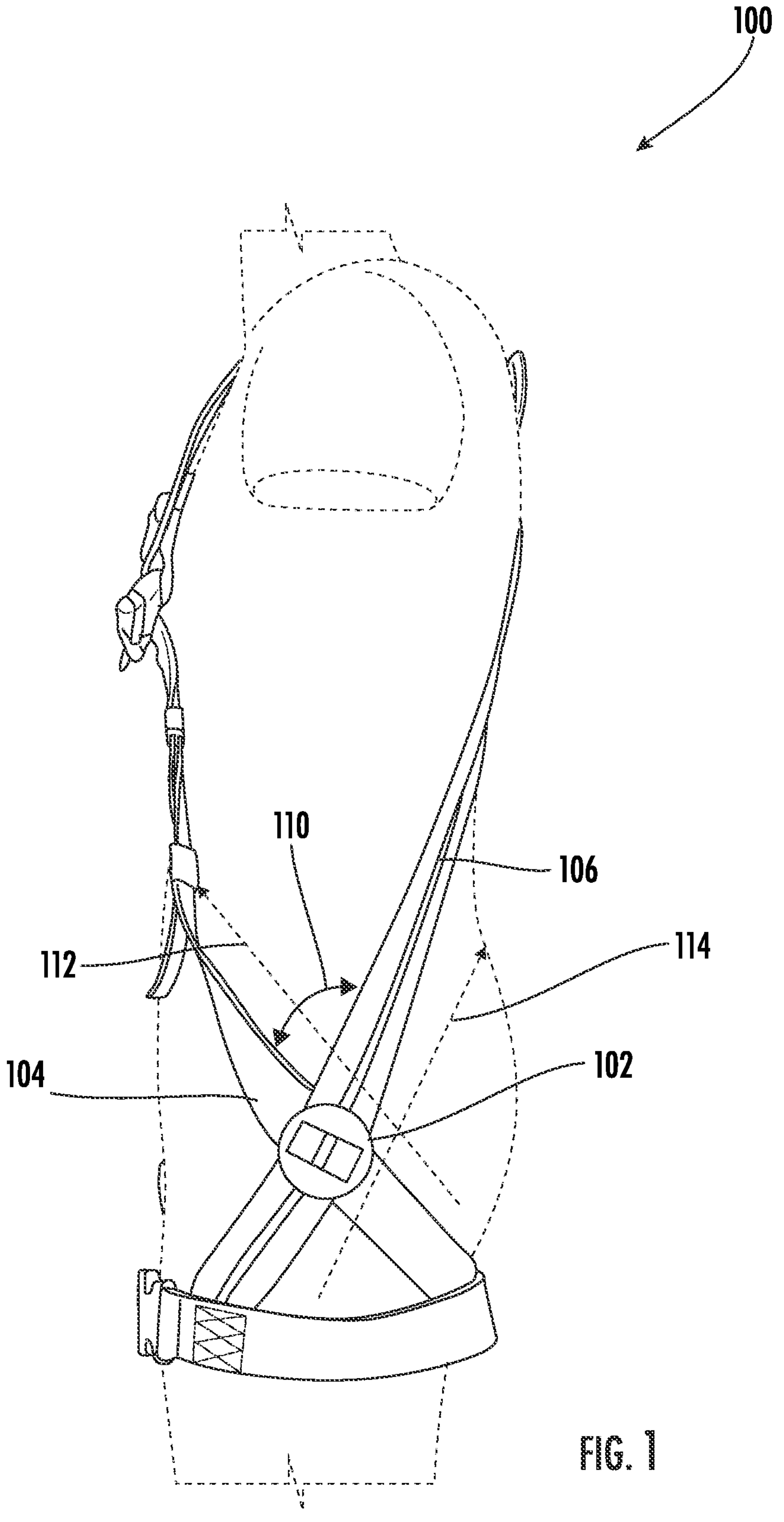
FIG. 1 illustrates a safety harness, in accordance with one or more embodiments of the present disclosure.

FIG. 1 illustrates an embodiment of a safety apparatus 100 having a conventional, commercially available full-body harness. Safety harness 100 can include an upper torso portion comprising first shoulder strap 104 and a second shoulder strap 106, respectively, for extending over the shoulders of a user and a multi-component chest strap (not shown) for extending over and/or wrapping around the chest of the user. A first end of each of the first shoulder strap 104 and second shoulder strap 106 may extend down over the chest of the user and the back of the user and couple with each other by means of a connector 102 at a waist of the user. The first shoulder strap 104 and the second shoulder strap 106 can crisscross each other at the connector 102 and extend over to one or more leg straps. The connector 102 enables the adjustment of a length of the first shoulder strap 104 and second shoulder strap 106 when the user is performing different movements which may involve, walking, stretching, squatting, etc. The connector facilitates flexion and/or extension of the first shoulder strap 104 and the second shoulder strap 106. The connector 102, may be made either from a polymer, a metal or an alloy, and is capable of bearing the stress and strain associated with the forces acting through the first shoulder strap 104 and the second shoulder strap 106. Moreover, the connector 102 can withstand the temperature variations occurring in the nature without deforming or breaking.

Based on the movement by the user, the connector 102 may move in a first direction 112 of the first shoulder strap 104 or in a second direction 114 of the second shoulder strap 106 in order to accommodate users of various shapes and sizes. Further, the connector 102 may rotate in such a manner which enables a variation of an angle 110 between the first shoulder strap 104 and the second shoulder strap 106. Such movements can ease the working of the user and moreover, enables the harness to be worn by workers of different shapes, sizes, height, weight, etc.

Figure 2:
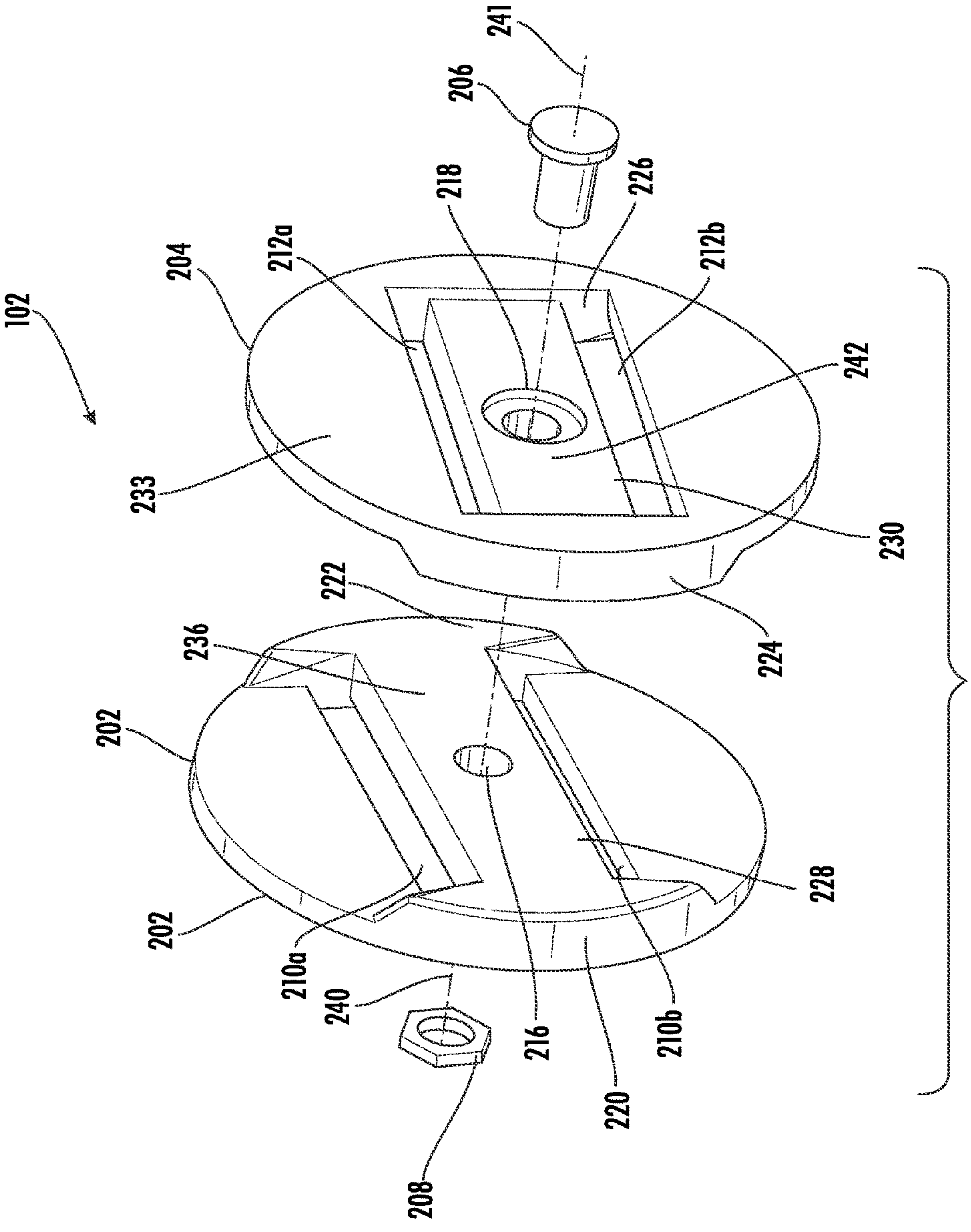
FIG. 2 illustrates a schematic diagram of a connector, in accordance with one or more embodiments of the present disclosure.

FIG. 2 illustrates an embodiment of the connector 102. The connector 102 can include a first plate 202, a second plate 204, and a fastener 206. The first plate 202 can be similar or even identical to the second plate 204. Both, the first plate 202 and the second plate 204 can have a first surface 232 and a second surface 234. The first plate 202 can include a first slit 210*a* and a second slit 210*b*, a first arcuate portion 220, a second arcuate portion 222, and a first rib 228. The first arcuate portion 220 and the second arcuate portion 222 can be integral to the first plate 202 and can be positioned on the periphery of the first plate 202. The first arcuate portion 220 and the second arcuate portion 222 are an extension of the first plate 202 over the first surface 232 along an axis parallel to a central axis 240. Further, the first arcuate portion 220 and the second arcuate portion 222 can be positioned opposite of each other. The second plate 204 may include a third slit 212*a*, a fourth slit 212*b*, a third arcuate portion 224, a fourth arcuate portion 226, and a second rib 230. A variation in the width of the slits enables an appropriate friction of the connector with the first shoulder strap 104 and/or the second shoulder strap 106. In an embodiment, the fastener 206 may include a nut 206 and a bolt 208. In some embodiments, the fastener 206 may be a screw or a rivet. The fastener 206 can facilitate a rotatable coupling of the first plate 202 to the second plate 204 such that the first plate 202 may freely rotate with respect to the second plate 204. The first plate 202 can be coupled to the second plate 204 such that the first surface 232 of the first plate 202 abuts the first surface 232 of the second plate 204. The first arcuate portion 220 and the second arcuate portion 222 can have a thickness greater than a thickness of a peripheral region of the first plate along the central axis 240 that is perpendicular to the first surface 232. The first rib 228 diametrically extends between the first arcuate portion 220 and the second arcuate portion 222. Further, the first slit 210*a* and the second slit 210*b* are defined on either side of the first rib 228. The first rib 228 defines a first cylindrical cavity 216 to facilitate an insertion of the fastener 206 into the first cylindrical cavity 216 along an axis parallel to the central axis 240 of the first cylindrical cavity 216. The first rib 228 includes a first rib surface 236 and a second rib surface 238. The first rib 228 is positioned in such a manner that the second rib surface 238 of the first rib 228 is offset from the second surface 234 of the first plate 202 along the central axis 240 of the first cylindrical cavity 216. The first slit 210*a* and second slit 210*b* are defined on either side of first rib 228. More specifically, the first slit 210*a* and the second slit 210*b* are defined between the first rib 228 and the peripheral regions of the first plate 202.

The second rib 230 diametrically extends between the third arcuate portion 224 and the fourth arcuate portion 226. The second rib 230 defines a second cylindrical cavity 218 to facilitate an insertion of the fastener 206 into the second cylindrical cavity along an axis parallel to the central axis 241 of the second cylindrical cavity 218. The second rib 230 includes a third rib surface 242 and a fourth rib surface 244. The second rib 230 is positioned in such a manner that the fourth rib surface 244 of the second rib 230 is offset from the fourth surface 243 of the second plate 204 along the central axis 241 of the second cylindrical cavity 218. The third slit 212*a* and fourth slit 212*b* are defined on either side of the second rib 230. More specifically, the third slit 212*a* and the fourth slit 212*b* are defined between the second rib 230 and the peripheral regions of the second plate 204.

The first plate 202 and the second plate 204 are coupled such that the first cylindrical cavity 216 of the first plate 202 overlaps the second cylindrical cavity 218 of the second plate 204 and both the cylindrical cavities have a common central axis. Once the common central axis is achieved, the fastener 206 may be inserted that enables the first plate 202 and the second plate 204 to be rotatably coupled. During operation, when a user wears the full body harness 100, the connector enables a manual adjustment of position of the connector 102 on the first shoulder strap 104 and the second shoulder strap 106. In an example embodiment, the connector 102, by means of rotation of the first plate 202 and the second plate 204 with each other, enables a variation of the angle 110 between the first shoulder strap 104 and the second shoulder strap 106.

Figure 3:
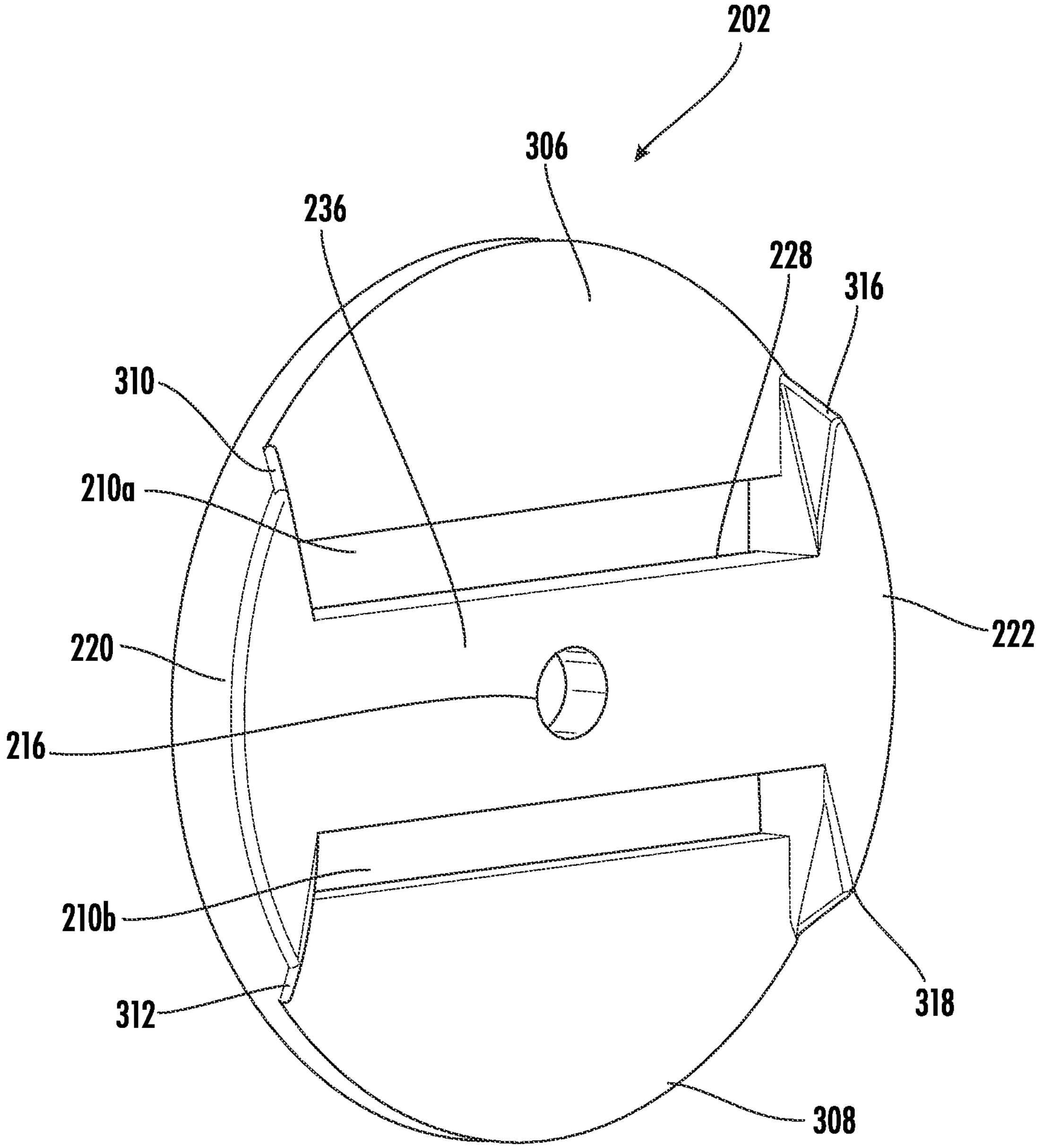
FIG. 3 illustrates a first view of a first surface of a first plate of the connector, in accordance with one or more embodiments of the present disclosure.

FIG. 3 illustrates an example of the first surface 232 of the first plate 202. An arc on the first surface 232 of the peripheral region of the first plate 202, between a first edge 310 of the first arcuate portion 220 and a third edge 316 of the second arcuate portion 222, defines a first channel 306. The first channel 306 is configured to receive a webbing. An arc on the first surface 232 of the first plate 202, between the second edge 312 of the first arcuate portion 220 and a fourth edge 318 of the second arcuate portion 222, defines a second channel 308. The second channel 308 is configured to receive a webbing. The first channel 306 is configured to receive the first shoulder strap 104 and facilitate a passage of the first shoulder strap 104 through the first slit **210*a* and over the second surface of the first rib 230. Thereafter, the first shoulder strap 104 may pass through the second slit 210*b* and over the second channel 308**.

Figure 4:
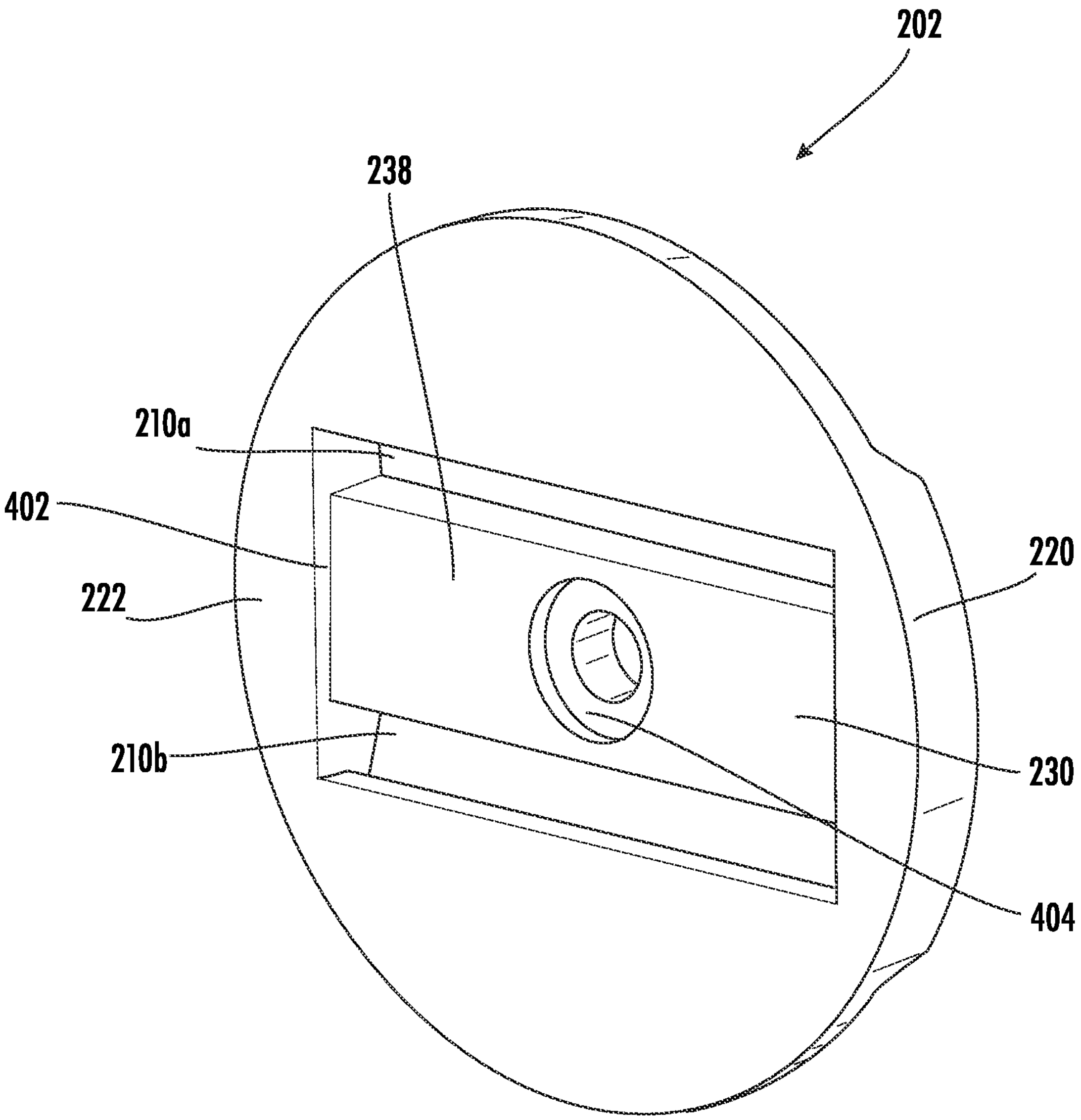
FIG. 4 illustrates a second view of second surface of the first plate of the connector, in accordance with one or more embodiments of the present disclosure.

FIG. 4 illustrates an embodiment of the second surface 234 of the first plate 202. The first rib 228 is positioned in such a manner that the second rib surface 238 of the first rib 228 is at an offset 402 from the second surface 234 of the first plate 202 along the central axis 240 of the first cylindrical cavity 216. The offset 402 allows an easy passage of the first shoulder strap 104 over the second surface of the first rib 228. The first rib 228 includes a counterbore 404 concentric to the first cylindrical cavity 216 defined on the first rib 228. The counterbore facilitates positioning of a nut or a head of the fastener 206.

Figure 5:
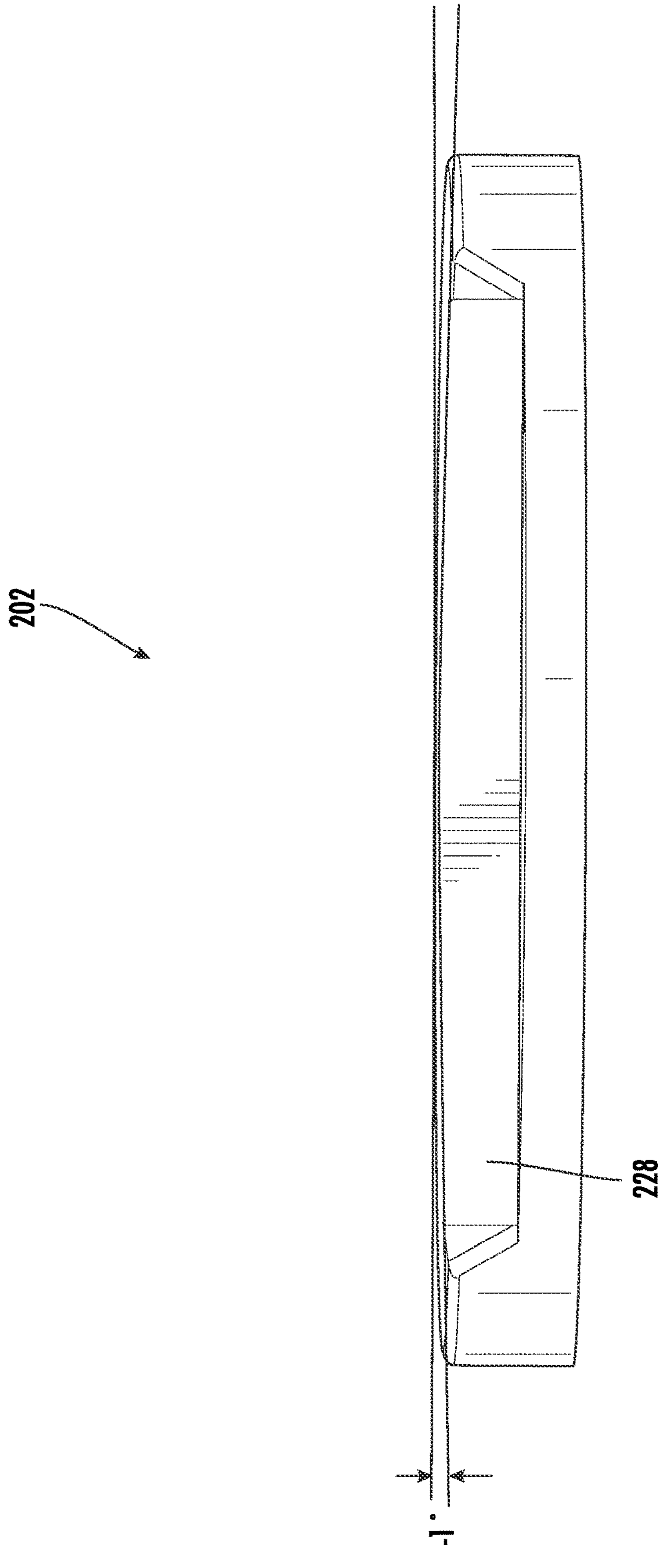
FIG. 5 illustrates a side view of the first plate of the connector, in accordance with one or more embodiments of the present disclosure.

FIG. 5 illustrates a side view of the first plate 202. In an exemplary embodiment, the first surface of the first rib 228 includes a first downward slope from the first cylindrical cavity 216 towards the first arcuate portion 220. The first surface of the first rib 228 includes a second downward slope from the first cylindrical cavity 216 towards the second arcuate portion 222. The first downward slope and the second downward slope reduce the friction between the first plate 202 and the second plate 204 when coupled together by means of a fastener 206. The first downward slope and the second downward slope create an offset. In an example embodiment, the first plate 202 may be coupled to the second plate 204 by the fastener 206. The offset enables a free rotation of the first plate 202 with respect to the second plate 204 along an axis defined by the fastener 206.

Figure 6:
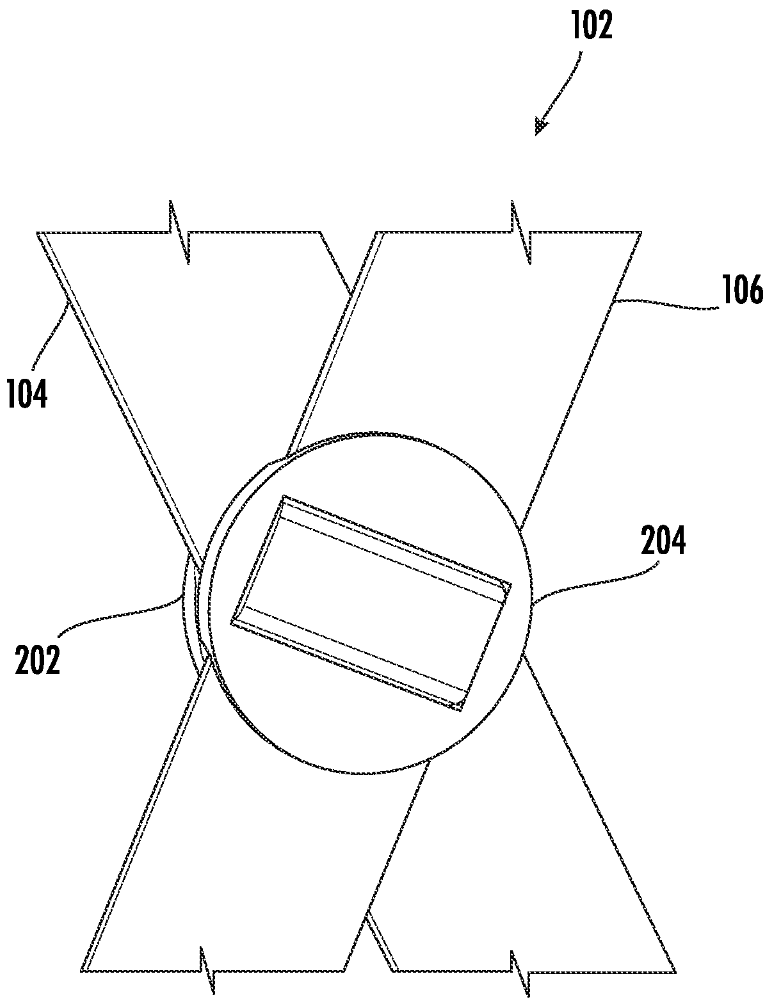
FIG. 6 illustrates an exemplary embodiment of a safety harness, in accordance with one or more embodiments of the present disclosure.

FIG. 6 illustrates a schematic view of the connector 102 with harness. The connector 102 includes a first plate 202 and a second plate 204. In an exemplary embodiment, the first shoulder strap 104 passes through the first plate 202, and the second shoulder strap passes through the second plate 204. The first plate 202 and the second plate 204 are coupled together by means of a fastener 206. In an embodiment, the connector 102 facilitates the adjustment of the first shoulder strap 104 and the second shoulder strap 106. Further, the connector enables the adjustment of an angle between the first shoulder strap 104 and the second shoulder strap 106 along a first direction 112 and the second direction 114, respectively. In an alternate embodiment, the first shoulder strap 104 includes a first webbing 608 and a second webbing 610, and the second shoulder strap 106 may have a third webbing 612 and a fourth webbing 614, where the connector 102 enables the adjustment of the angle 110 between the first webbing 608 and the third webbing 612, as illustrated in the FIG. 7.

Figure 7:
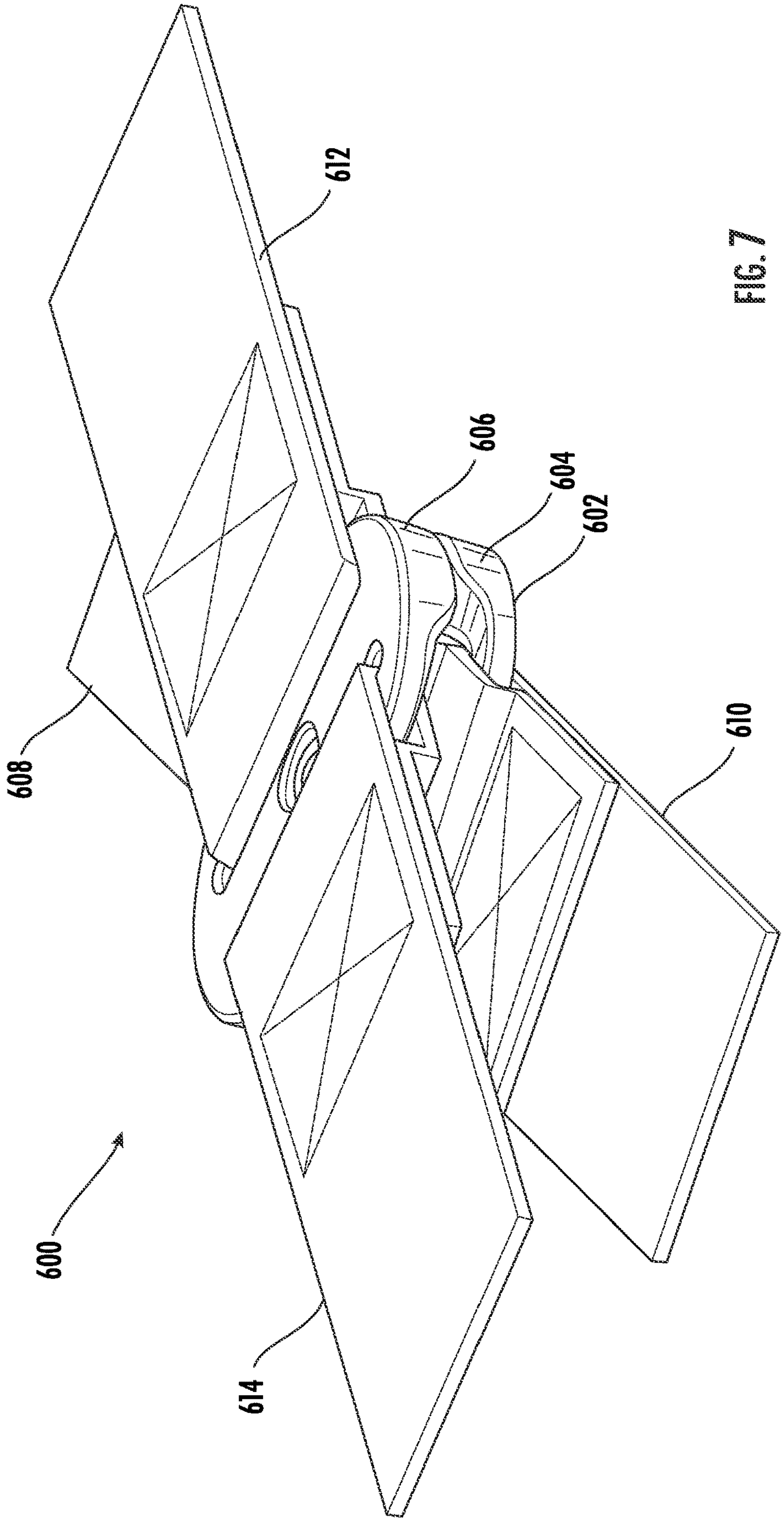
FIG. 7 illustrates an alternate embodiment of a safety harness, in accordance with one or more embodiments of the present disclosure.

FIG. 7 illustrates an alternate embodiment of a safety harness 600. Safety harness 600 includes a connector 602, a plurality of webbings including a first webbing 608, a second webbing 610, a third webbing 612, and a fourth webbing 614. In an example embodiment, the plurality of webbings are separate from each other. The connector 602 includes a first plate 604, a second plate 606, wherein the first plate 604 and the second plate 606 are rotatably coupled together by means of the connector 602. The connector 602 enables the adjustment of the angle between the plurality of webbings such that users of different shapes and sizes may wear and operate the harness with ease. The connector 602 is identical to the connector 102, with the only the difference being the geometrical shape. The connector 602 includes all the elements of the connector 102. In an example embodiment, the first webbing 608, the second webbing 610, the third webbing 612, and the fourth webbing 614 may be connected to separate slits of the first plate 602 and the second plate 604.

Figure 8:
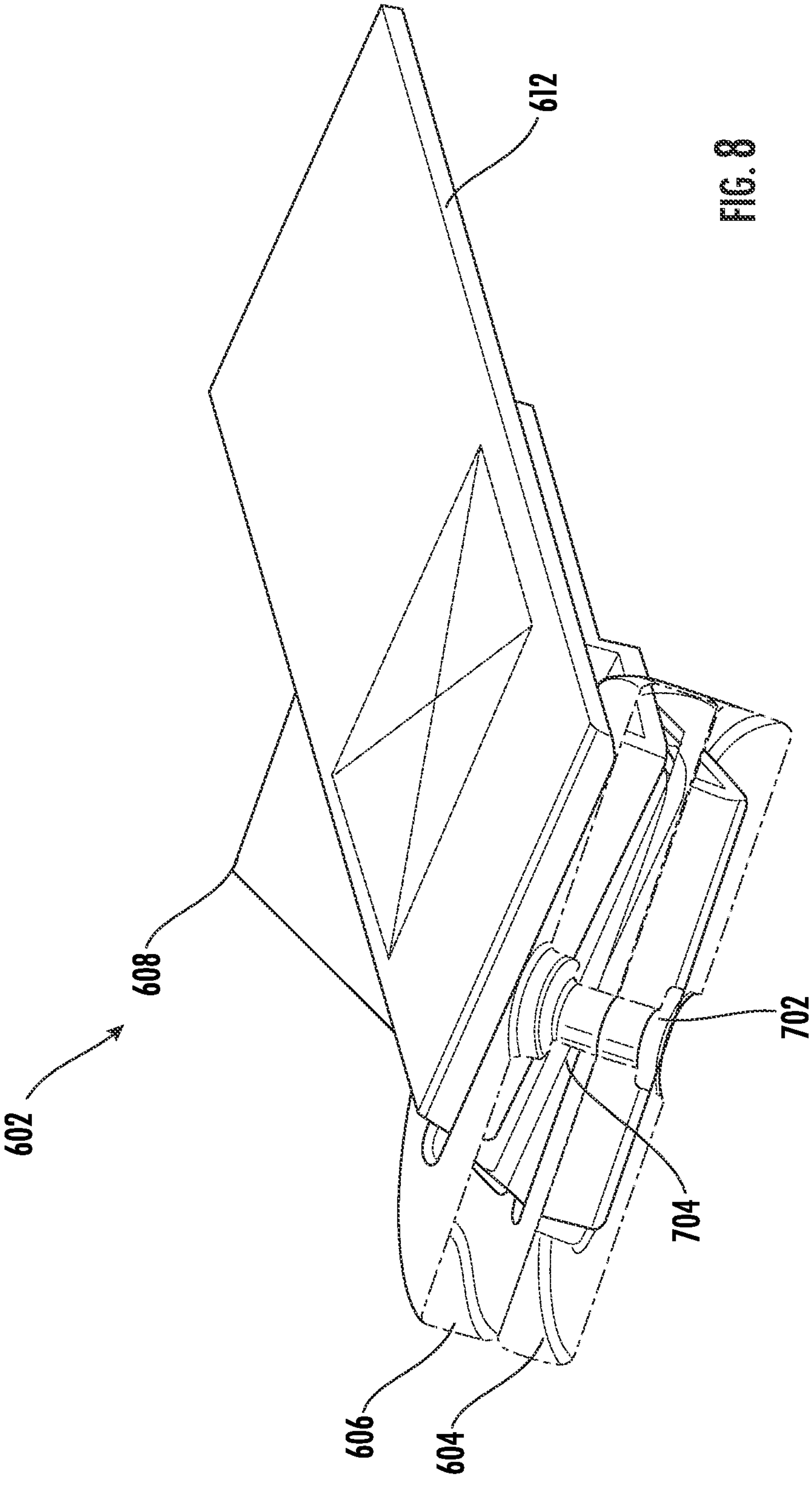
FIG. 8 illustrates a sectional view of a connector, in accordance with one or more embodiments of the present disclosure, in accordance with one or more embodiments of the present disclosure.
Figure 9A:
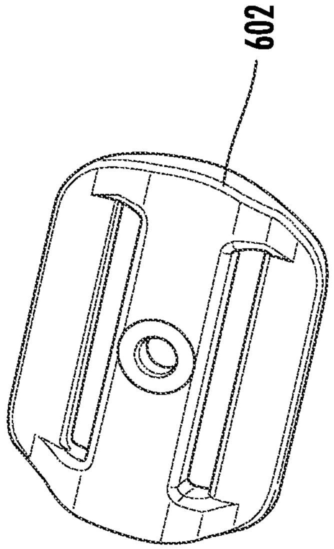
FIG. 9*a* illustrates an alternate embodiment of a first view of a first plate of the connector, in accordance with one or more embodiments of the present disclosure.
Figure 9B:
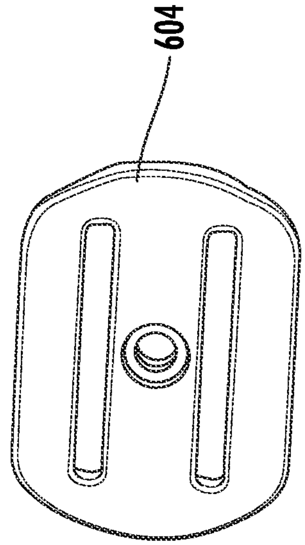
FIG. 9*b* illustrates an alternate embodiment of a second view of a first plate of the connector, in accordance with one or more embodiments of the present disclosure.

FIG. 8 illustrates a sectional view of the connector 602. The connector 602 includes a first plate 604, a second plate 606. The first plate 604 includes a first cylindrical cavity 702 configured to receive a fastener (not shown herein). The second plate 606 includes a second cylindrical cavity 704 configured to receive the fastener. The first plate 604 is rotatably coupled to the second plate 606 by means of the fastener (not shown herein) similar to the fastener 206 illustrated in the FIG. 2.

FIG. **9*a* illustrates an example embodiment of the first plate 604 of the connector 602. The first plate 604 may be made from a metal, a polymeric material or an alloy. In an embodiment, the first plate 604** may have any geometrical shape, such as a circular, oval, square or a rectangular shape.

FIG. **9*b* illustrates an example embodiment of the second plate 606 of the connector 602. The second plate 606 may be made from a metal, a polymeric material or an alloy. In an embodiment, the second plate 606** may have any geometrical shape, such as a circular, oval, square or a rectangular shape.

Figure 10:
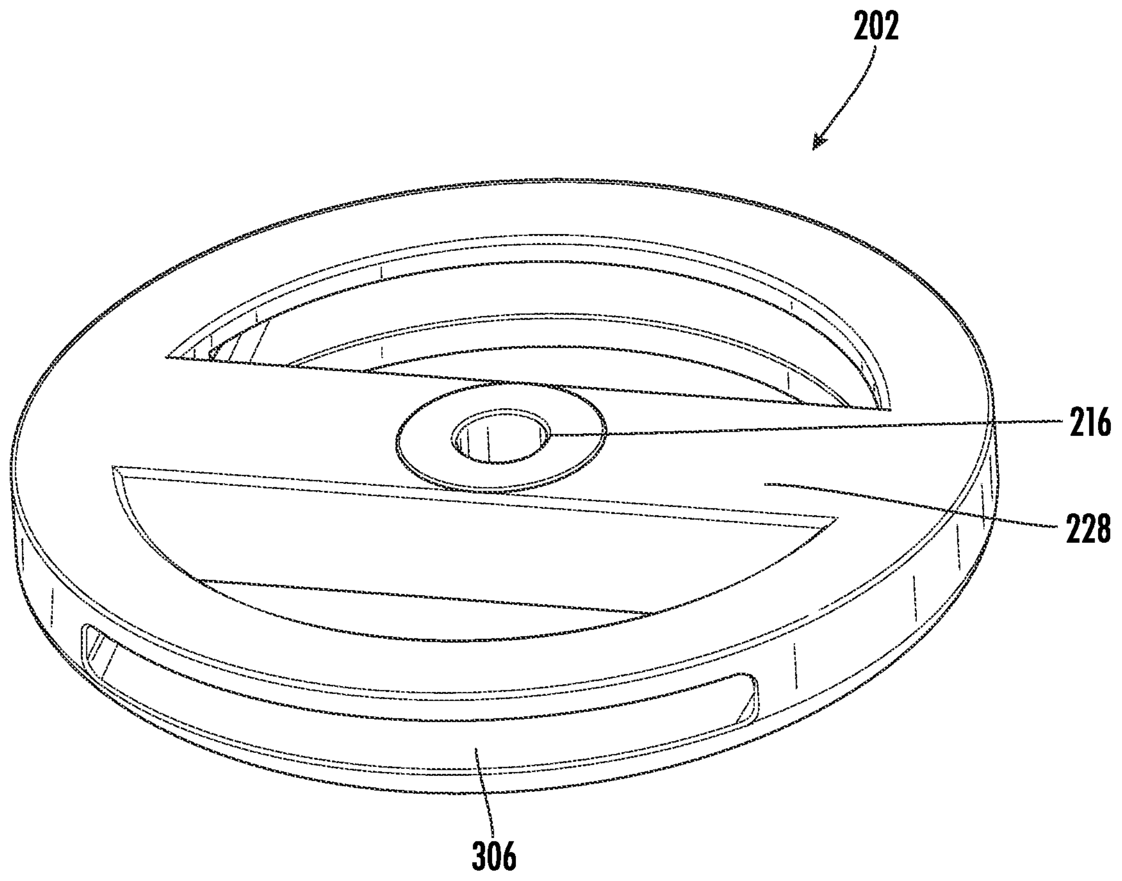
FIG. 10 illustrates an alternate embodiment of the first plate of the connector, in accordance with one or more embodiments of the present disclosure.

FIG. 10 illustrates an example embodiment of the first plate 202 of the connector 102. In an example embodiment, the first channel 306 and the second channel 308 may be a slit at the peripheral region of the first plate 202, such that the slit is perpendicular to the central axis 240. The slit facilitates easy passage of the first shoulder strap 104 therethrough. Moreover, the slit shape of the channel 306 and second channel 308 hinders development of any frictional resistance between the straps associated with the first plate 202 and the second plate 204 of the connector 102. In some embodiments, the first cylindrical cavity 216 on the first rib 228 may include an annular bead. In some embodiments, the first rib 228 may not include any downward slope.

Many modifications and other embodiments set forth herein will come to mind to one skilled in the art to which these disclosures pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A connector comprising:

a first plate defining a first plurality of slits;

a second plate defining a second plurality of slits, wherein each of the first plate and the second plate comprise a plurality of arcuate portions at a peripheral region of the first plate and the second plate, wherein a thickness of each arcuate portion is greater than a thickness of the peripheral region of the respective plate; and a fastener that facilitates a coupling of the first plate with the second plate, such that the first plate and the second plate are rotatable with respect to each other, wherein the first plurality of slits in the first plate is configured to receive a first strap, wherein the second plurality of slits in the second plate is configured to receive a second strap that is separate from the first strap, wherein the first plate comprises a first rib defining a first cavity to receive the fastener such that the first rib extends diametrically between the plurality of arcuate portions of the first plate, and wherein a first surface of the first rib defines:

a first downward slope from the first cavity towards a first arcuate portion of the plurality of arcuate portions of the first plate; and a second downward slope from the first cavity towards a second arcuate portion of the plurality of arcuate portions.

2. The connector of claim 1, wherein the second plate comprises a second rib, such that the second rib extends between the plurality of arcuate portions of the second plate.

3. The connector of claim 2, wherein the second rib defines a second cavity configured to receive the fastener.

4. The connector of claim 3, wherein a first surface of second rib defines a downward slope towards distal ends.

5. The connector of the claim 1, wherein the plurality of arcuate portions on the first plate define a first channel and a second channel, such that the first channel and the second channel are configured to facilitate receiving of the first strap.

6. The connector of the claim 1, wherein the plurality of arcuate portions on the second plate define a third channel and a fourth channel, such that the third channel and the fourth channel are configured to facilitate receiving of the second strap.

7. A safety apparatus comprising:

a connector, wherein the connector comprises:

a first plate defining a first plurality of slits;

a second plate defining a second plurality of slits, wherein each of the first plate and the second plate comprise a plurality of arcuate portions at a peripheral region of the first plate and the second plate, wherein a thickness of each arcuate portion is greater than a thickness of the peripheral region of the respective plate;

a fastener that facilitates a coupling of the first plate with the second plate, such that the first plate and the second plate are rotatable with respect to each other, a first strap, wherein the first strap is configured to move across the first plurality of slits; and a second strap, wherein the second strap is configured to move across the second plurality of slits, wherein the first strap is different from the second strap, wherein the first plate comprises a first rib defining a first cavity to receive the fastener such that the first rib extends diametrically between the plurality of arcuate portions of the first plate, and wherein a first surface of the first rib defines:

a first downward slope from the first cavity towards a first arcuate portion of the plurality of arcuate portions of the first plate; and a second downward slope from the first cavity towards a second arcuate portion of the plurality of arcuate portions.

8. The safety apparatus of claim 7, wherein the second plate comprises a second rib, such that the second rib extends between the plurality of arcuate portions of the second plate.

9. The safety apparatus of claim 8, wherein the second rib defines a second cavity configured to receive the fastener.

10. The safety apparatus of claim 9, wherein a first surface of the second rib defines a downward slope towards distal ends thereof.

11. The safety apparatus of the claim 7, wherein the plurality of arcuate portions on the first plate define a first channel and a second channel, such that the first channel and the second channel are configured to facilitate receiving of the first strap.

12. The safety apparatus of the claim 7, wherein the plurality of arcuate portions on the second plate define a third channel and a fourth channel, such that the third channel and the fourth channel are configured to facilitate receiving of the second strap.

* * * * *